United States Patent [19]
Hibi

[11] Patent Number: 5,592,311
[45] Date of Patent: Jan. 7, 1997

[54] APPARATUS FOR FORMING COLOR IMAGES HAVING REDUCED EDGE EXAGGERATION WITH HIGH RATE UNDERCOLOR REMOVAL

[75] Inventor: Yoshiharu Hibi, Kanagawa, Japan

[73] Assignee: Fuji Xerox Co., Ltd., Tokyo, Japan

[21] Appl. No.: 627,395

[22] Filed: Apr. 4, 1996

Related U.S. Application Data

[63] Continuation of Ser. No. 310,742, Sep. 22, 1994, abandoned.

[30] Foreign Application Priority Data

Oct. 6, 1993 [JP] Japan ................................. 5-250424

[51] Int. Cl.⁶ ............................ H04N 1/56; H04N 1/60
[52] U.S. Cl. ........................................ 358/518; 358/529
[58] Field of Search ............................... 358/518, 520, 358/521, 522, 523, 529, 532, 530, 462, 537, 447, 448, 452; 382/167

[56] References Cited

U.S. PATENT DOCUMENTS

| | | | |
|---|---|---|---|
| 4,700,399 | 10/1987 | Yoshida | 358/529 |
| 5,047,844 | 9/1991 | Ikeda et al. | 358/521 |
| 5,119,187 | 6/1992 | Ikeda et al. | 358/523 |
| 5,270,807 | 12/1993 | Ikeda et al. | 358/500 |
| 5,315,382 | 5/1994 | Tanioka | 358/462 |
| 5,357,353 | 10/1994 | Hirota | 358/518 |

FOREIGN PATENT DOCUMENTS

| | | |
|---|---|---|
| 1-241978 | 9/1989 | Japan. |
| 4-239269 | 8/1992 | Japan. |

*Primary Examiner*—Scott A. Rogers
*Attorney, Agent, or Firm*—Finnegan, Henderson, Farabow, Garrett & Dunner, L.L.P.

[57] ABSTRACT

The present invention provides a color image forming apparatus for forming a color image using signals for coloring materials for yellow, magenta, cyan and black, comprises black amount detection means for detecting a signal corresponding to a black amount in each pixel, operation means for performing an operation on the detected signal in a scope of the pixel to be processed and its neighbor, and adjustment means for adjusting a coefficient for a filtering process on each color signal of a coloring material for the pixel to be processed based on a signal obtained by said operation.

1 Claim, 5 Drawing Sheets

☒ A PIXEL FOR BLACK AMOUNT PATTERN MATCH (BINARIZATION RESULT IS ON)

▨ A PIXEL TO BE PROCESSED

☐ A PIXEL FOR BLACK AMOUNT PATTERN MATCH (BINARIZATION RESULT IS OFF)

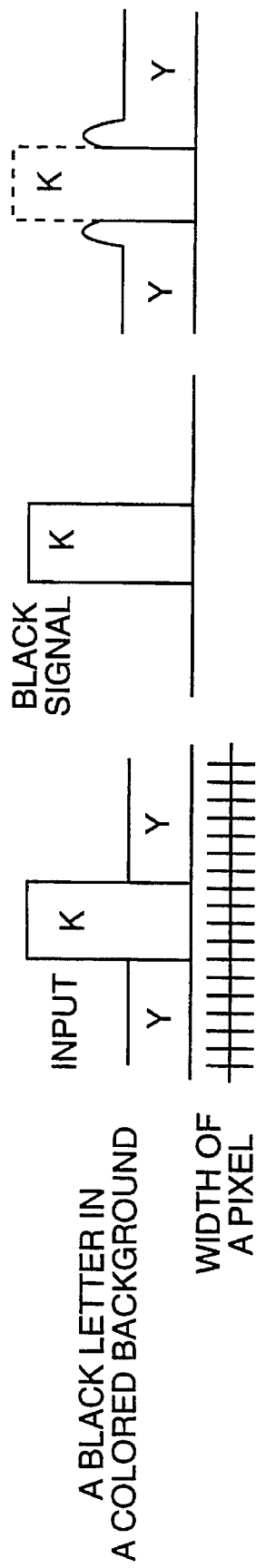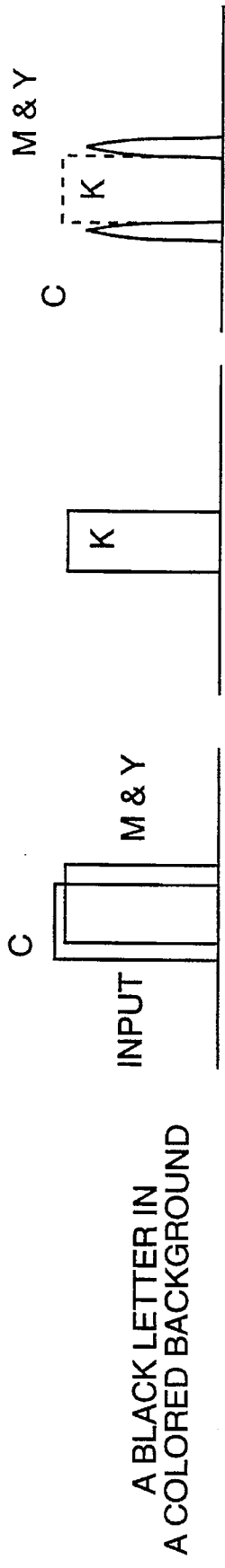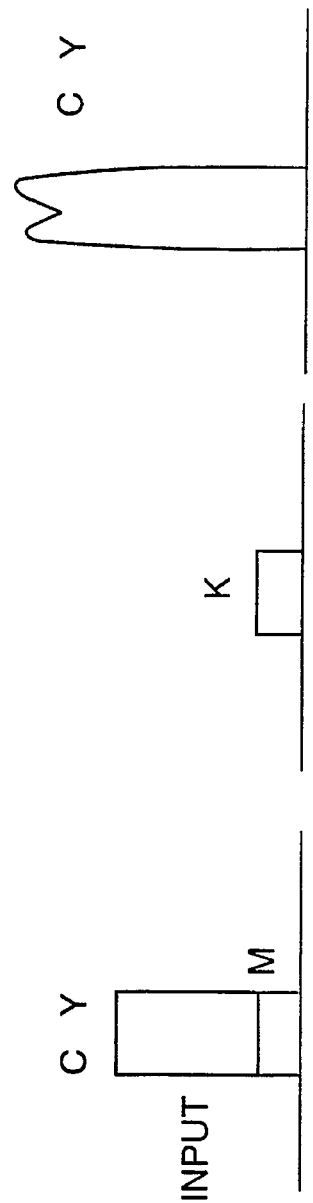
FIG. 8(a) A BLACK LETTER IN A COLORED BACKGROUND
FIG. 8(b) A BLACK LETTER IN A COLORED BACKGROUND
FIG. 8(c) A COLOR LETTER

APPARATUS FOR FORMING COLOR IMAGES HAVING REDUCED EDGE EXAGGERATION WITH HIGH RATE UNDERCOLOR REMOVAL

This application is a continuation, of application Ser. No. 08/310,742, filed Sep. 22, 1994, now abandoned.

BACKGROUND OF THE INVENTION

1. Field of the Invention

The present invention relates to a color copying machine, a color printer or a color facsimile apparatus which forms a color image consisting of four color components, yellow, magenta, cyan and black.

2. Discussion of the Related Art

In a conventional digital color image forming apparatus, a black signal is generated based on primary signals of yellow, magenta and cyan corrected in accordance with pigments for a printer or the like and an amount of signals equal to the amount of the black signal is subtracted from the primary signals of yellow, magenta and cyan, employing a method of under color removal (hereinafter, UCR). In this process it is known that parameters such as a degree of gray density of the image to which the black pigment is added, or the amount of the black pigment to be .added greatly affects the quality of a formed color image, an amount of used pigments, or stability in image formation. For example, if a parameter such as the UCR of a high ratio is performed in an image area of low gray density, a total amount of yellow, magenta, cyan and black pigments to be consumed can be reduced, thus reducing the cost and improving the transfer efficiency owing to a decrease in pile height of the pigments. There is also an advantage in the image quality that a gray balance is improved or a ratio of conversion of black letters or the like with only black pigment is increased.

However, there are some cases in which directions as to simple high rate UCR (for example, 100%) causes undesirable edge generation by color components removed by UCR in an image where black letters are located in colored background, for example. FIGS. 8(a)–(c) illustrate problems of black letters in a colored background or a white background. As shown in FIG. 8(a), if a filtering processing circuit for exaggerating an edge is provided after color signal generation, colored edges around black letters in the original image are exaggerated as described above, which causes a problem of producing a rough image. In an original image including a white background and black letters in it, another problem occurs in the case where there are great differences among modulation transfer functions (MTF) of a color scanner for each of red, green and blue signals, or great influences caused by delicate registration errors in scanning. Thus, a colored edge is generated around the black letter as shown in FIG. 8(b), and therefore directions as to simple high rate UCR (for example, 100%) exaggerates the colored edge unnecessarily.

An invention disclosed by Japanese Patent Application Unexamined Publication No. Hei. 1-241978 restrains the occurrence of the colored edge. However, this invention basically relates to a gray shade edge in a white background and cannot be applied to the black letters in a colored background described above.

SUMMARY OF THE INVENTION

The present invention has been made in view of the above circumstances and has as an object a provision of a color image forming apparatus which restrains unnecessary exaggeration of edges occurring around black letters in a colored background and unnecessary exaggeration of colored edges occurring around black letters in a white background when high rate UCR is directed to be carried out.

Additional objects and advantages of the invention will be set forth in part in the description which follows and in part will be obvious from the description, or may be learned by practice of the invention. The instrumentalities and combinations of the invention are particularly pointed out in the appended claims. To achieve the objects, and in accordance with the purpose of the invention, as embodied and broadly described herein, a color image forming apparatus for forming a color image using signals for coloring materials of yellow, magenta, cyan and black black amount detection means for detecting a signal corresponding to a black amount in each pixel, operation means for performing an operation on the detected signal in a scope of the pixel to be processed and its neighbor, and adjustment means for adjusting a coefficient for a filtering process on each signal of the coloring material for the pixel to be processed based on a signal obtained by the operation.

With the above construction, the color image forming apparatus according to the present invention detects a signal corresponding to a black amount in an original image, performs an operation on the detected signal in a scope of a pixel to be processed and its neighbor, and adjusts or selects a filtering process coefficient for the pixel to be processed based on the signal after operation, which restrains unnecessary exaggeration of color component signals.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

FIGS. 5(a) and 5(b) show examples of weight coefficient employed in another embodiment of the color image forming apparatus according to the present invention;

FIGS. 8(a) through 8(c) show problems of black letters in a colored background or a white background.

DETAILED DESCRIPTION OF THE PREFERRED EMBODIMENTS

A preferred embodiment of a color image forming apparatus according to the present invention is now described in detail based on the drawings.

Figure 1:
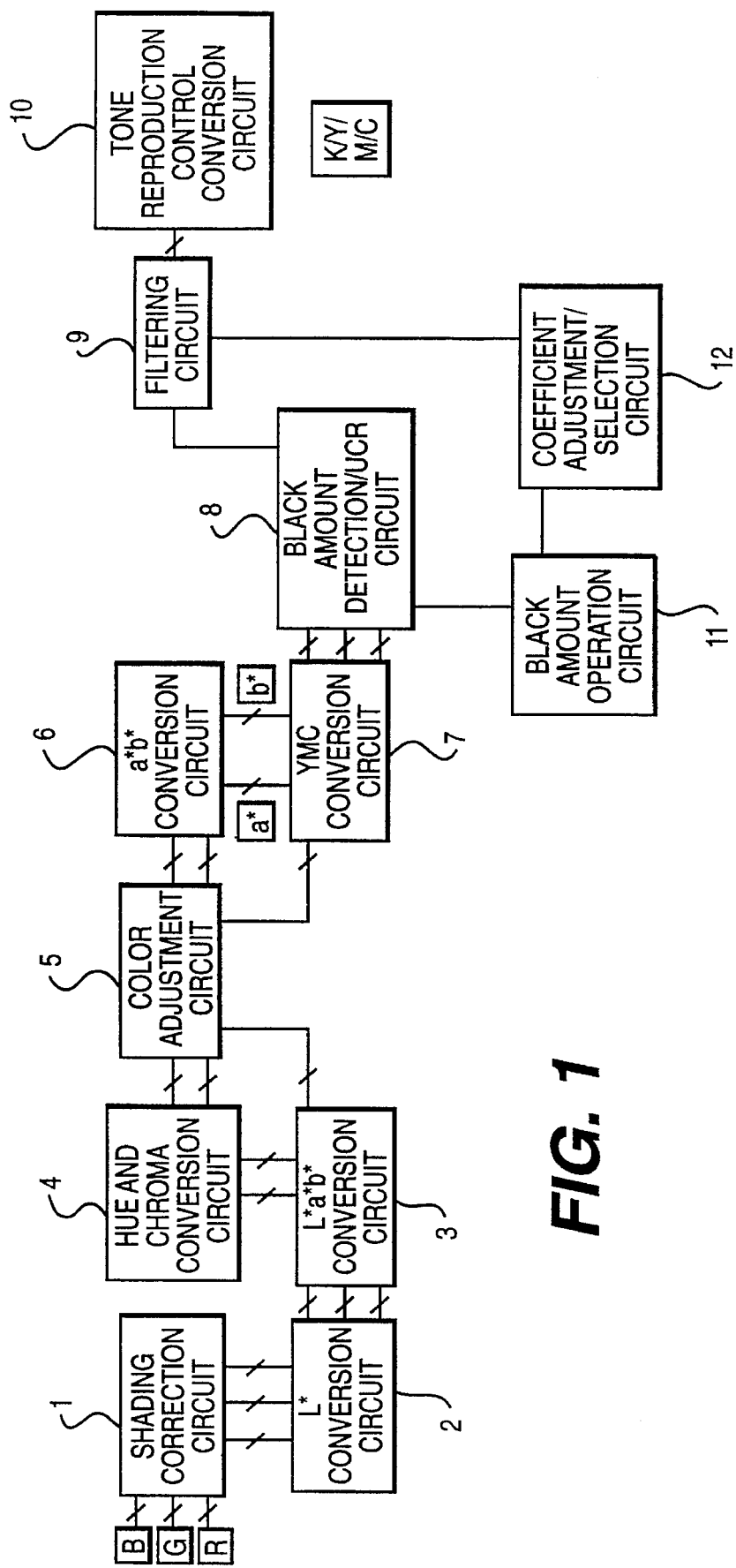
FIG. 1 shows an embodiment of a color image forming apparatus according to the present invention.

FIG. 1 shows an embodiment of the color image forming apparatus according to the present invention. The embodiment will be explained using a schematic construction of a copying apparatus which forms a color image by performing scanning four times in accordance with a developing cycle of each of yellow, magenta, cyan and black pigments. However, it is not intended to limit the invention to a color image forming apparatus of such construction.

In FIG. 1, after a color CCD sensor reads original image signals separated into red (R), green (G) and blue (B), a shading correction circuit 1 performs adjustment of each of the red, green and blue pixels on quality variation from one pixel to another in a chip, unevenness of quantity of light, or the like. An $L^*$ conversion circuit 2 converts signals of reflectance read by the CCD sensor into signals of lightness scale $L^*b$, $L^*g$ and $L^*r$. An $L^*a^*b^*$ conversion circuit 3 converts the signals of lightness scale $L^*b$, $L^*g$ and $L^*r$ into standard system value $(L^*a^*b^*)$ signals. In the standard system value $(L^*a^*b^*)$ signals, an axis $L^*$ of the system values indicates lightness and two-dimensional surface of axis $a^*$ and axis $b^*$ orthogonal to the axis $L^*$ indicates chroma and hue. A hue and chroma conversion circuit 4 generates signals H (hue) and C (chroma) from the system value $(L^*a^*b^*)$ signals. A color adjustment circuit 5 performs color adjustment so that, with respect to H (hue) H'=H+$\Delta$H, with respect to C (chroma) C'=$\gamma$C, and for $L^*$, $L^{*'}$=$\beta L^*+\Delta L^*$, and then carries out color recognition and color conversion. An $a^*b^*$ conversion circuit 6 reverses the effect of the hue and chroma conversion and converts signals H and C into $a^*$ and $b^*$. A YMC conversion circuit 7 converts the system value $(L^*a^*b^*)$ into output signals yellow, magenta and cyan. A black amount detection/UCR circuit 8 generates a black separation, signals of yellow, magenta and cyan by UCR and then selects and outputs color signals in accordance with development color pigments and also functions as a circuit for detecting the black amount and regularly outputting the detected amount. A filtering circuit 9 adjusts sharpness of each development color pigment signals yellow, magenta, cyan and black. A tone reproduction control (TRC) conversion circuit 10 performs nonlinear gradation conversion corresponding to output characteristics of image output terminal (IOT) and color balance adjustment. A black amount operation circuit 11 carries out an operation on the detected black amount and a coefficient adjustment/selection circuit 12 adjusts or selects a filtering coefficient used in the filtering circuit 9 based on the result of operation.

Figure 2:
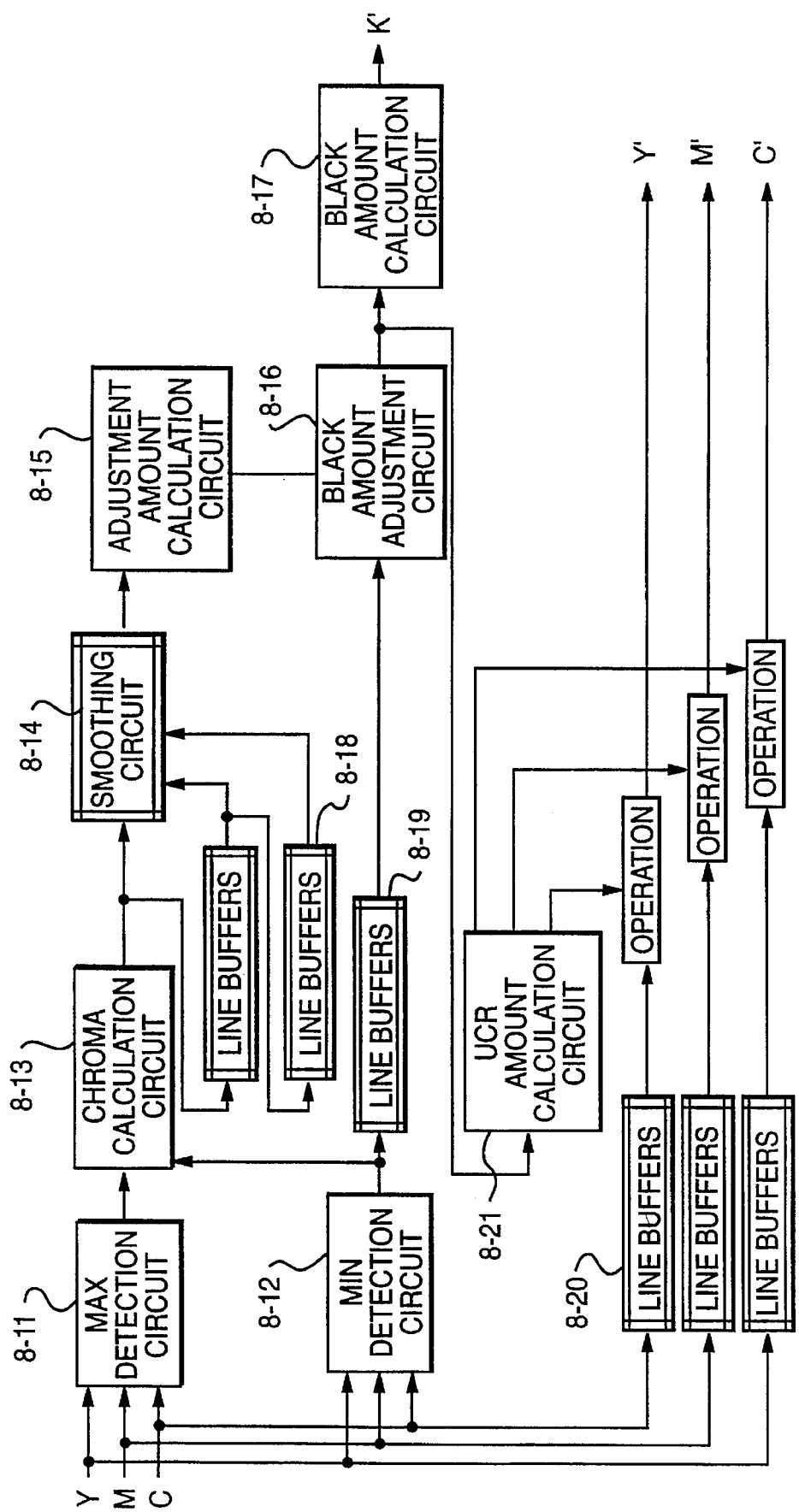
FIG. 2 shows an example of construction of black amount detection/UCR circuit shown in FIG. 1.
Figures 3, 4, 5:
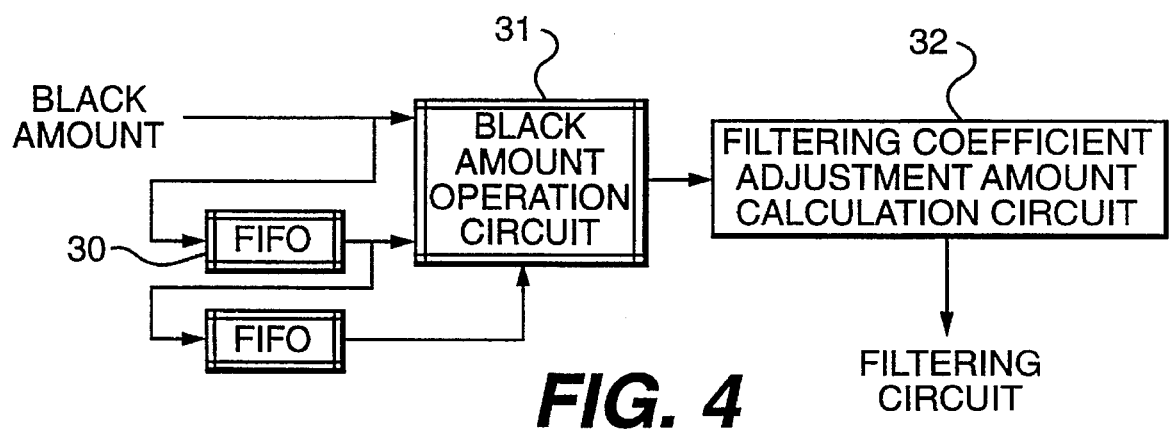
FIG. 3 shows an example of filtering coefficient used in a smoothing circuit.
FIG. 4 shows a black amount operation circuit and an adjusted filtering coefficient calculation circuit.

Next, processes of black amount detection and UCR are described in detail. FIG. 2 shows a construction example of black amount detection/UCR circuit and FIG. 3 shows an example of filtering coefficient used in the smoothing circuit, where 0 indicates a lightest area in a formed image, and, as the value increases, the area in the formed image becomes darker. In FIG. 2, a maximum detection circuit 8–11 detects a maximum value (max) from Y, M and C signal values and a min detection circuit 8–12 detects a minimum value (min) from Y, M and C signal values. A chrome-calculation circuit 8–13 calculates max (Y, M, C)–min (Y, M, C) based on outputs of the max detection circuit 8–11 and min detection circuit 8–12 and outputs a value corresponding to chroma. A smoothing filter circuit is a filtering circuit for smooths the black amount of a pixel to be processed and its neighbor using signals of several scanning lines corresponding to chroma held by a line buffer 8–18.

A digital filter size of 3×3 pixels is shown as an example in this embodiment, but it is not limited to this size and generally defined by an arbitrary size m×n. A coefficient shown in FIG. 3 can be used as the filtering coefficient, but it is not limited to and can be arbitrarily changed depending on a filter size, smoothing characteristics, or the like.

An adjustment amount calculation circuit 8–15 determines a black amount to be adjusted according to the smoothed chroma amount. Adjustment can be performed by the following equation so that the black amount to be reduced is increased as the smoothed chroma amount of the pixel to be processed becomes larger:

$$Y=aX+b$$

wherein Y is an amount to be adjusted, X is a smoothed chroma amount, a and b are coefficients for adjustment. Adjustment can also be carried out by providing nonlinear relationship using a lookup table (LUT).

A black amount adjustment circuit 8–16 subtracts an adjustment amount from min (Y, M, C). A black amount calculation circuit 8–17 outputs the adjusted black amount K' if necessary. For example, adjustment can be performed by the following equation, whereby gradation of black amount is easily adjusted:

$$Y=eX+f$$

wherein Y is a black amount to be adjusted, X is a black amount and e and f are coefficients for adjustment. Nonlinear relationship provided by a lookup table can also be used for adjustment. An amount K' output by the black amount calculation circuit 8–17 is regarded as a signal for the detected black amount.

A UCR amount calculation circuit 8–21 calculates the UCR amount based on the black amount determined by the black amount adjustment circuit 8–16. Calculation can be performed by the following equation so that a UCR amount is constantly increased as a black amount increases:

$$Y=cX+d$$

wherein Y is a UCR amount, X is a black amount, c and d are coefficients for calculation. Nonlinear relationship may be provided using a lookup table for calculation. For example, if it is directed that UCR is performed at the rate of 100%, and c=1 and d=0, UCR will be performed at a white image level. Line buffers 8–19 and 8–20 determine timing for line delay in the smoothing circuit 8–14. The signals Y, M and C are converted into signals Y', M' and C', respectively, by subtracting the UCR amount. The UCR amount described above is separately adjusted per each of the signals Y, M and C, but the UCR amount for each signals Y, M and C may be the same.

Figure 6:
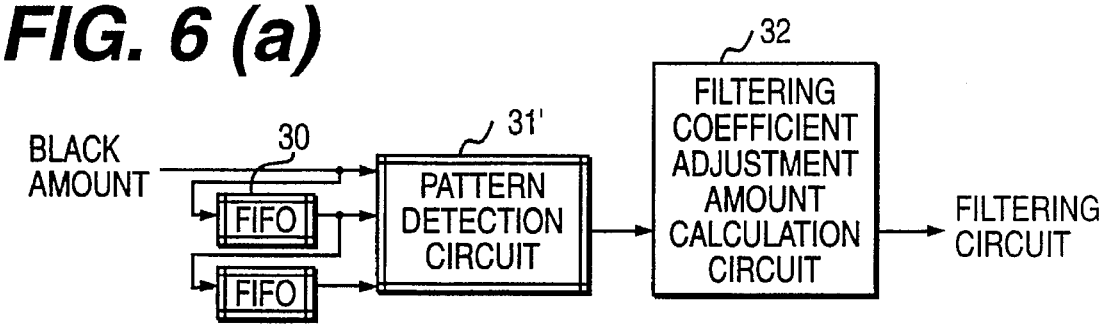
FIGS. 6(a) and 6(b) shows an example of the construction using a pattern detection circuit employed in the other embodiment of the color image forming apparatus according to the present invention.
Figure 6:
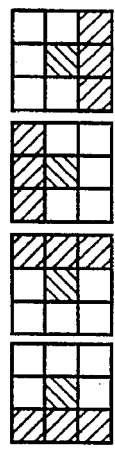
Figure 7:
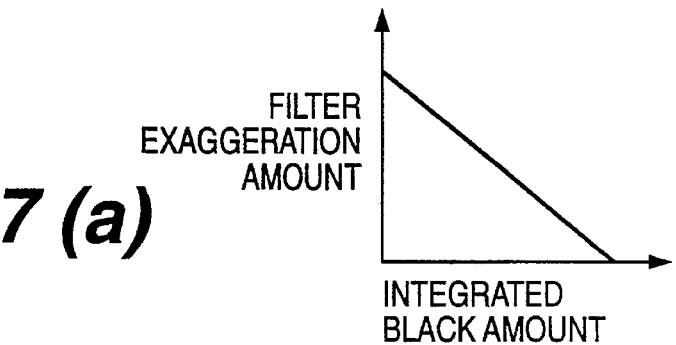
FIGS. 7(a) through 7(c) show examples of exaggeration of digital filter.
Figure 7:
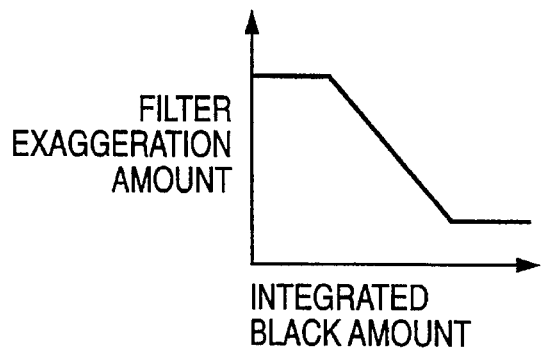
Figure 7:
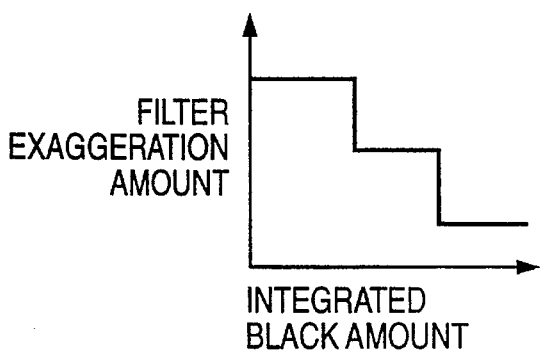

FIG. 4 illustrates a black amount operation circuit 31 and a filtering coefficient adjustment amount calculation circuit 32 FIGS. 5(a) and 5(b) illustrate examples of weighting coefficient, FIGS. 6(a) and 6(b) show an example in which the black amount operation circuit 31 is replaced with a pattern detection circuit, and FIGS. 7(a) through 7(c) show examples of filter exaggeration amount.

The black amount input by the black amount detection/ UCR circuit 31 to the black amount operation circuit is buffered by FIFO 30, for example, as shown in FIG. 4 the operation circuit 31 performs an operation on a neighbor of a pixel to be processed. Description herein is based on a digital filter size of 3×3 pixels for convenience, but generally may be represented by M×N pixels.

The operation circuit 31 obtains the sum total of black amount of input pixels of a 3×3 window size, whereby a signal for determining the black amount is output. In another embodiment, a weighting coefficient shown in FIG. 5(a) can be used for performing an operation and determining the black amount, or a coefficient such as shown in FIG. 5(b) can be used for calculating an average value of pixels can also be used.

As the other embodiment, a pattern detection circuit 31' is used as shown in FIG. 6(a) and adjacent patterns of black pixels are prepared as shown in FIG. 6(b). The black amount is thus binarized and based on a pattern match between the binarized black amount and prepared adjacent patterns, and sharpness exaggeration amounts for color components yellow, magenta and cyan of a pixel to be processed are selected. Above examples employ binary conversion, but multivalued pattern matching can be used for multiple selection though the apparatus becomes bulky, thus selecting the sharpness exaggeration amount in accordance with the black amount.

In developing cycles for yellow, magenta and cyan based on an input signal, the filtering coefficient adjustment calculation circuit 32 continuously changes the filtering coefficient in subsequent processes. For example, continuous control from a strong exaggeration amount to a weak exaggeration amount in accordance with the black amount as shown in FIG. 7(a), continuous control of the exaggeration amount in a certain range as shown in FIG. 7(b), or selective control of the exaggeration amount as shown in FIG. 7(c) can be specified. Thus, the filtering coefficient adjustment amount calculation circuit 32 can output a continuous control signal, or output a selection signal for selecting a predetermined group of coefficients by employing a filtering circuit construction of a certain type.

As described above, the color image forming apparatus according to the present invention controls the filtering coefficient used in development cycles for each of color components yellow, magenta and cyan based on the black amount of the neighbor of the pixel to be processed. Therefore, the filtering coefficient applied to undesirable colored pixels surrounding black letters in the case of black letters in the colored background as shown in. FIG. 8(a), or applied to undesirable colored pixels around black letters in the white background as shown in FIG. 8(b), is reduced by the black amount of the neighbor of the pixel to be processed, thus restraining occurrence of the problems previously described.

With respect to pixels in color letters to which exaggeration of sharpness is originally required, since the black amount in surrounding pixels is small, original exaggeration amount is applied as shown in FIG. 8(c). In a part of a pictorial image such as a picture including a large black amount, for example an area of black hair, the image is principally formed with a black pigment by performing a high rate UCR process whereby restraining sharpness of under color components yellow, magenta and cyan has little effect.

As clear from the above description, the color image forming apparatus according to the present invention detects a signal corresponding to a black amount in an original image, performs operation on the detected signal in a scope of a pixel to be processed and its neighbor, and adjusts or selects a digital filtering coefficient for the pixel to be processed based on the signal after operation; accordingly it is possible to restrain unnecessary exaggeration of an edge which occurs around a black letter in a colored background and unnecessary exaggeration of a colored edge around a black letter in a white background in the case where high rate UCR is directed to be carried out.

The foregoing description of preferred embodiments of the invention has been presented for the purpose of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claim appended hereto, and its equivalents.

What is claimed is:

1. A color image forming apparatus for forming a color image having a plurality of pixels with use of respective color signals for coloring materials of yellow, magenta, cyan and black for each pixel processed in forming the image, said apparatus comprising:

black amount detection means for detecting a black amount in each processed pixel to produce a color adjustment signal for each processed pixel according to the black amount detected therefor;

operation means for performing an operation on each color adjustment signal according to a detected black amount for at least one pixel adjacent to the processed pixel; and adjustment means for adjusting a coefficient for a filtering process applied to the color adjustment signal for each processed pixel based on a result of the adjacent pixel color adjustment signal operation to suppress exaggeration of color signals for at least one of yellow, magenta and cyan coloring materials to be applied to image portions having substantial black content.

\* \* \* \* \*